US012621301B2

(12) United States Patent
Dubreil et al.

(10) Patent No.: US 12,621,301 B2
(45) Date of Patent: May 5, 2026

(54) SCALABLE ARCHITECTURE OF SERVERS PROVIDING ACCESS TO DATA CONTENT

(71) Applicant: KLAXOON, Cesson-Sevigne (FR)

(72) Inventors: Tony Dubreil, Fougeres (FR); Romain Guyonvarh, Rennes (FR); Jérôme Steunou, Parthenay de Bretagne (FR); Mark Veldhuizen, St Jean sur Couesnon (FR); Pierre Pagadoy, Baulon (FR); Matthieu Beucher, Cesson-Sevigne (FR)

(73) Assignee: KLAXOON, Cesson-Sevigne (FR)

( * ) Notice: Subject to any disclaimer, the term of this patent is extended or adjusted under 35 U.S.C. 154(b) by 772 days.

(21) Appl. No.: 17/258,137

(22) PCT Filed: Jul. 10, 2019

(86) PCT No.: PCT/EP2019/068615
§ 371 (c)(1),
(2) Date: Jan. 5, 2021

(87) PCT Pub. No.: WO2020/011887
PCT Pub. Date: Jan. 16, 2020

(65) Prior Publication Data
US 2021/0160246 A1 May 27, 2021

(30) Foreign Application Priority Data
Jul. 10, 2018 (EP) .................................... 18290076

(51) Int. Cl.
*H04L 9/40* (2022.01)
*H04L 67/141* (2022.01)
(52) U.S. Cl.
CPC ............ *H04L 63/102* (2013.01); *H04L 63/08* (2013.01); *H04L 67/141* (2013.01)

(58) Field of Classification Search
CPC ..... H04L 63/102; H04L 63/08; H04L 67/141; H04L 67/10; H04L 63/101; H04L 63/083;
(Continued)

(56) References Cited

U.S. PATENT DOCUMENTS

| | | | |
|---|---|---|---|
| 6,732,176 B1 * | 5/2004 | Stewart | H04W 48/14 709/227 |
| 9,596,263 B1 | 3/2017 | Brooker | |

(Continued)

FOREIGN PATENT DOCUMENTS

| | | |
|---|---|---|
| CN | 101124578 A | 2/2008 |
| CN | 107770276 A | 3/2018 |

(Continued)

OTHER PUBLICATIONS

Nikos Fotiou et al., Access Control for the Internet of Things, 2016, pp. 1-10. (Year: 2016).*

(Continued)

*Primary Examiner* — Luu T Pham
*Assistant Examiner* — Canh Le
(74) *Attorney, Agent, or Firm* — BakerHostetler

(57) ABSTRACT

An access to resources and data management by servers is provided. In order to provide to users a universal access point to an application, while allowing a strict control of the ownership and localization of data, a first device receives from a user a request to access a resource, and, if the user has the right to access a resources, sends to the user an identifier of a communication endpoint of a second device, among a plurality of second devices, that is able to access the resource and deliver the resource to the client.

8 Claims, 13 Drawing Sheets

(58) Field of Classification Search

CPC ......... H04L 67/02; H04L 9/32; H04L 9/3226;
G06F 21/6218; G06F 21/6209

See application file for complete search history.

(56) References Cited

U.S. PATENT DOCUMENTS

| | | | |
|---|---|---|---|
| 2003/0014315 A1* | 1/2003 | Jaalinoja | G06Q 20/16 |
| | | | 705/18 |
| 2004/0039816 A1* | 2/2004 | Bae | H04L 67/5682 |
| | | | 709/225 |
| 2005/0154764 A1* | 7/2005 | Riegler | G06Q 30/02 |
| 2006/0167857 A1* | 7/2006 | Kraft | G06F 16/24575 |
| 2010/0125670 A1 | 5/2010 | Dondeti et al. | |
| 2014/0330869 A1* | 11/2014 | Factor | G06F 21/6281 |
| | | | 707/783 |
| 2015/0180872 A1 | 6/2015 | Christner | |
| 2015/0372994 A1 | 12/2015 | Stuntebeck | |
| 2016/0087964 A1 | 3/2016 | Irving, Jr. et al. | |
| 2017/0118202 A1 | 4/2017 | Mathew et al. | |
| 2017/0118216 A1 | 4/2017 | Roth | |
| 2017/0195457 A1 | 7/2017 | Smith et al. | |
| 2017/0364601 A1* | 12/2017 | Charles | G06F 16/955 |

FOREIGN PATENT DOCUMENTS

| | | |
|---|---|---|
| JP | 2003-509775 A | 3/2003 |
| WO | 01/20531 A1 | 3/2001 |

OTHER PUBLICATIONS

Virgil Zamfirache et al., Extending the Moodle Course Management System for Mobile Device, 2013, pp. 1-6. (Year: 2013).*

English translation of the Notification of the First Office Action issued in Chinese Patent Application No. 201980046042.X dated Aug. 24, 2023.

English translation of Notice of Rejection issued in Japanese Patent Application No. 2020-571601 dated Jul. 4, 2023.

* cited by examiner

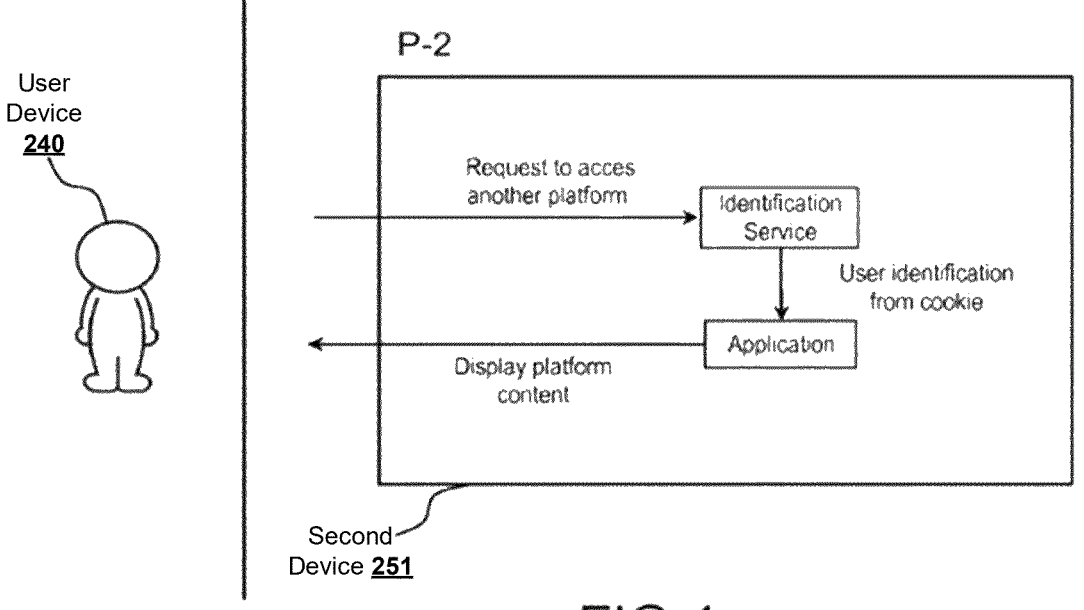

User
Device
240

P-2

Request to acces
another platform → Identification
Service

User identification
from cookie

Display platform
content ← Application

Second
Device 251

FIG.4c

First
Device
200

Fourth
Communication
Endpoint 290

Processing
Logic 230

Send
530a

Data
Storage(s)
220

User
Device
240

Third
Communication
Endpoint 211

All access
code

Send
520a

Send
540a

Second
Device 250

Send 510a

Send
550a

Data
Storage(s)
280

P1 access
code

Send 560a

Second
Communication
Endpoint 260

Processing
Logic 270

FIG.5a

710 — Receive resource request

720 — Access data storage

730 — Verify right to access the resource

740 — Send communication endpoint

700

SCALABLE ARCHITECTURE OF SERVERS PROVIDING ACCESS TO DATA CONTENT

CROSS-REFERENCE TO RELATED APPLICATIONS

This application is a National Stage of International patent application PCT/EP2019/068615, filed on Jul. 10, 2019, which claims priority to foreign European patent application No. EP 18290076.1, filed on Jul. 10, 2018, the disclosures of which are incorporated by reference in their entirety.

FIELD OF THE INVENTION

The present invention generally relates to the field of computing and communications. More specifically, the invention relates to the access and management of resources using a plurality of servers.

BACKGROUND PRIOR ART

The access to resources and data stored in servers become nowadays more and more critical, as the amount of data provided to users, and the number of applications using such data increase sharply. In computing, a server is a computer program or device that provides functionality for other programs or devices, called "clients". The computation of a server can be performed on a single device, or distributed across a plurality of devices.

A number of different kinds of server exist, such as database server allowing a client to perform requests and retrieve information from a database, file servers that are intended to store files, mail servers that allow receiving and sending mails, etc. . . . .

A number of servers are intended to provide to clients access to resources. A resource can be any data or information that is stored on a server, to be retrieved by a client in order to be presented to a user. For example, a resource can be a picture that is stored in a server, in order to be sent upon request from a client. Such servers intended to provide access to resources to clients are used in a number of applications. For example, servers dedicated to social networks store large amounts of resources (pictures, videos, posts . . . ) that are sent to clients upon request, to be displayed for example in web browsers or mobile apps.

Such kinds of servers can also be used for professional applications. For example, the applicant has developed an innovative solution to perform interactive presentations wherein the user performing the presentation can insert interactive content (polls, games . . . ) in a presentation. The content of the presentations can be stored as a resource in servers, and be retrieved upon request by clients. Such content may comprise for example data to be presented/ displayed by the dynamic presentation (images, videos, text . . . ), and/or data collected based on the inputs of users during the execution of the dynamic presentation (e.g. statistics, scores, or the like).

As the number of clients increases, the amount of data stored in the servers for an application may also increase dramatically. The Quality of Service (QoS) offered by the servers may then get poorer, for a variety of reasons: the bandwidth and/or computing resources of the servers may become insufficient to manage the requests for an increasing number of clients, and the latency to manage the requests of the users may increase; when the resources are stored in database that are getting larger, the response time to query a resource in the database may also increase; in case of worldwide clients, if all servers are located in the same location, the clients that are based in a different country, or continent than the servers may also experience high latencies due to the communication times across different countries or continents.

The term "scalability" designates the ability of a system, or service, to accommodate a growth in the demand, and to be able to preserve its QoS when responding to a higher demand (i.e an increasing number of clients, an increasing number of resources to provide, etc. . . . ).

Some server architectures are qualified as "single tenant", when a specific infrastructure is created for each client: for example, each client (or group of clients, for example a company) may be served by a dedicated infrastructure, for example servers and databases that are dedicated for its use only. This solution provides the advantage of ensuring that the data from a client will not be accessed by another client, and to precisely locate data. However, this solution does not achieve very good results in terms of scalability. Indeed, the infrastructure related to each client need to be adapted separately, which in the same time hardly allows using quickly additional resource when the resource needs of a client increase, and may result into a waste of resources when the resource needs of a client decrease.

Other architectures of server applications are qualified as "multi tenant". In such architectures, the same infrastructures (servers, storage . . . ) are used for a plurality of clients. This type of architecture is more efficient than single tenant architectures to achieve scalability, because the same resources are used for a plurality of clients, so resources can be allocated dynamically according to the needs of the client. However, in such architectures the data from all clients are stored in the same storage. Therefore, it is much more difficult to ensure that data from a client will not be accessed by another. Moreover, if a large number of clients are located all over the world, different servers will usually be deployed in different countries/continents in order to serve all clients with a limited latency. In such a case, all data from all clients will be replicated in the different servers all over the world. This is an issue, because this does not allow a precise localization of the data, which is an issue because clients are getting more and more concerned about the physical localization of their data. This also wastes storage resources, because data belonging to a client that is based in a country may be replicated in other countries and continents, wherein they will not be used.

Therefore, none of existing solutions allows in the same time to provide a unique and universal access to a service, and a fine control of the access and localization of data for each client.

There is accordingly a need for a device that allows a unique and universal access to a service, while allowing clients to control the access and localizations of their data.

SUMMARY OF THE INVENTION

To this effect, the invention discloses a first device comprising: a first communication endpoint configured to establish a connection with a user device; an access to one or more first data storages storing: user credentials for a plurality of users; a set of identifiers of resources stored on two or more second data storages accessed respectively by two or more second devices, each identifier in the set having associated therewith access rights, and an identifier of a second communication endpoint of a second device having an access to a second data storage storing the resource; one or more first processing logics configured, upon receiving a request from the user device to access a said resource, said request comprising a said identifier of the resource, to: verify, based on access rights associated with the received resource identifier, if the user has the right to access the requested resource; if a said user associated with said user device has the right to access the requested resource, to send to the user device the identifier of the communication endpoint of the second device having an access to the second data storage storing the resource.

Advantageously, said one or more first processing logics are configured, upon an authentication request from the user device further comprising a user credential, to authenticate the user associated with said user device based on said user credential and user credentials for the plurality of users.

Advantageously, the first device further comprises a third communication endpoint configured to establish a connection with one or more fourth communication endpoints of the one or more second devices.

Advantageously, the first processing logic is further configured, upon the reception of a resource identifier creation request from one of the second devices, to: create a unique identifier of a resource; associate to said unique identifier of the resource an identifier of said one the two or more second devices, or a second communication endpoint thereof; send to said one the two or more second devices the unique identifier of the resource.

Advantageously, the one or more first processing logics are further configured to: generate identification data allowing the one or more second devices to identify the user and grant access to the resource, and identification validation data allowing the validation of the identification of the user; send to the user device the identification data.

Advantageously, the one or more first processing logics are configured, upon a reception, from said second device having an access to the second data storage storing the resource, a request to identify the user comprising said identification data, to: validate the identification of the user based on said identification data and said identification validation data; if the identification is validated, send to said second device a validation of the identification of the user and the right of the user to access the resource.

Advantageously, the one or more first processing logics are configured, upon a reception, from said second device having an access to the second data storage storing the resource, of a request to identify the user comprising said identification data, to send to said second device having an access to the second data storage storing the resource said identification validation data.

Advantageously, the one or more first processing logics are configured, upon the generation of the user validation data, to send to the one or more second devices identification validation data.

Advantageously, the one or more first processing logics are configured to generate the identification validation data based on the identification data and shared secret keys that are common the first device and the one or more second devices.

Advantageously, the identification data is a token, and the identification validation data is a signature of the token.

The invention also discloses a method comprising: receiving a request from a user device to access a resource, said request comprising an identifier of the resource; accessing one or more first data storages storing: user credentials for a plurality of users; a set of identifiers of a set of resources comprising said requested resource, said set of resources stored on two or more second data storages accessed respectively by two or more second devices, each identifier in the set having associated therewith access rights, and an identifier of a second communication endpoint of a second device having an access to a second data storage storing the resource; verifying, based on access rights associated with the resource identifier, if a user associated with said user device has the right to access the resource; if the user associated with said user device has the right to access the resource, sending to the user device the identifier of the communication endpoint of the second device having an access to the second data storage storing the requested resource.

The invention also discloses a computer program product comprising: a non-transitory computer-readable storage medium; and program code stored on the non-transitory computer-readable storage medium that, when executed by one or more processors, causes the one or more processors to: receive a request from a user device to access a resource, said request comprising an identifier of the resource; access one or more first data storages storing: user credentials for a plurality of users; a set of identifiers of a set of resources comprising said requested resource, said set of resources stored on two or more second data storages accessed respectively by two or more second devices, each identifier in the set having associated therewith access rights, and an identifier of a second communication endpoint of a second device having an access to a second data storage storing the resource; verify, based on access rights associated with the resource identifier, if a user associated with said user device has the right to access the resource; if the user associated with said user device has the right to access the resource, send to the user device the identifier of the communication endpoint of the second device having an access to the second data storage storing the requested resource.

The invention also discloses a first device comprising: an access to one or more first data storages storing: user credentials for a plurality of users; a set of identifiers of resources stored on two or more second data storages accessed respectively by two or more second devices, each identifier in the set having associated therewith access rights, and an identifier of a second communication endpoint of a second device having an access to a second data storage storing the resource; a third communication endpoint configured to establish a connection with one or more fourth communication endpoints of the one or more second devices; a first processing logic configured, upon the reception of a resource identifier creation request from one of the two or more second devices, to: create a unique identifier of a resource; associate to said unique identifier of the resource an identifier of said one the two or more second devices, or a second communication endpoint thereof; send to said one of the second devices the unique identifier of the resource.

The invention also discloses a method comprising: receiving a resource identifier creation request from one of two or more second devices; accessing one or more first data storages storing: user credentials for a plurality of users; a set of identifiers of a set of resources, said set of resources stored on two or more second data storages accessed respectively by said two or more second devices, each identifier in the set having associated therewith access rights, and an identifier of a second communication endpoint of a second device having an access to a second data storage storing the resource; creating a unique identifier of a resource; associating to said unique identifier of the resource an identifier of said one of the two or more second devices, or a second communication endpoint thereof; sending to said one of the two or more second devices the unique identifier of the resource.

The invention also discloses a computer program product comprising: a non-transitory computer-readable storage medium; and program code stored on the non-transitory computer-readable storage medium that, when executed by one or more processors, causes the one or more processors to: receive a resource identifier creation request from one of two or more second devices; access one or more first data storages storing: user credentials for a plurality of users; a set of identifiers of a set of resources, said set of resources stored on two or more second data storages accessed respectively by said two or more second devices, each identifier in the set having associated therewith access rights, and an identifier of a second communication endpoint of a second device having an access to a second data storage storing the resource; create a unique identifier of a resource; associate to said unique identifier of the resource an identifier of said one of the two or more second devices, or a second communication endpoint thereof; send to said one of the two or more second devices the unique identifier of the resource.

The disclosure allows user devices to benefit from a universal and centralized access to a service.

The disclosure allows a strict separation between the resources belonging to different clients, as well as a strict control of the localization of data.

The disclosure allows the successful development of scalable applications.

The invention allows a reduction of bandwidth and storage needs, as well as a reduction of the latency to obtain a resource.

In certain aspects, the disclosure allows a reduction of the size of files that are shared between users.

In certain aspects, the disclosure allows the creation of new resources while strictly controlling resource access and localization of the newly created resource.

In certain aspects, the disclosure allows a management of the identification, authentication of users and the access rights of resources in a centralized way, in the universal access point, despite the repartition of the resources in large number of different devices.

BRIEF DESCRIPTION OF THE DRAWINGS

The invention will be better understood and its various features and advantages will emerge from the following description of a number of exemplary embodiments and its appended figures in which:

FIGS. 4a to 4c depict respectively 3 flowcharts of user interactions in a number of embodiments of the invention;

FIGS. 5a to 5e depict exemplary flowcharts for the creation and retrieval of a resource in a number of embodiments of the invention;

DETAILED DESCRIPTION OF THE INVENTION

Figure 1:
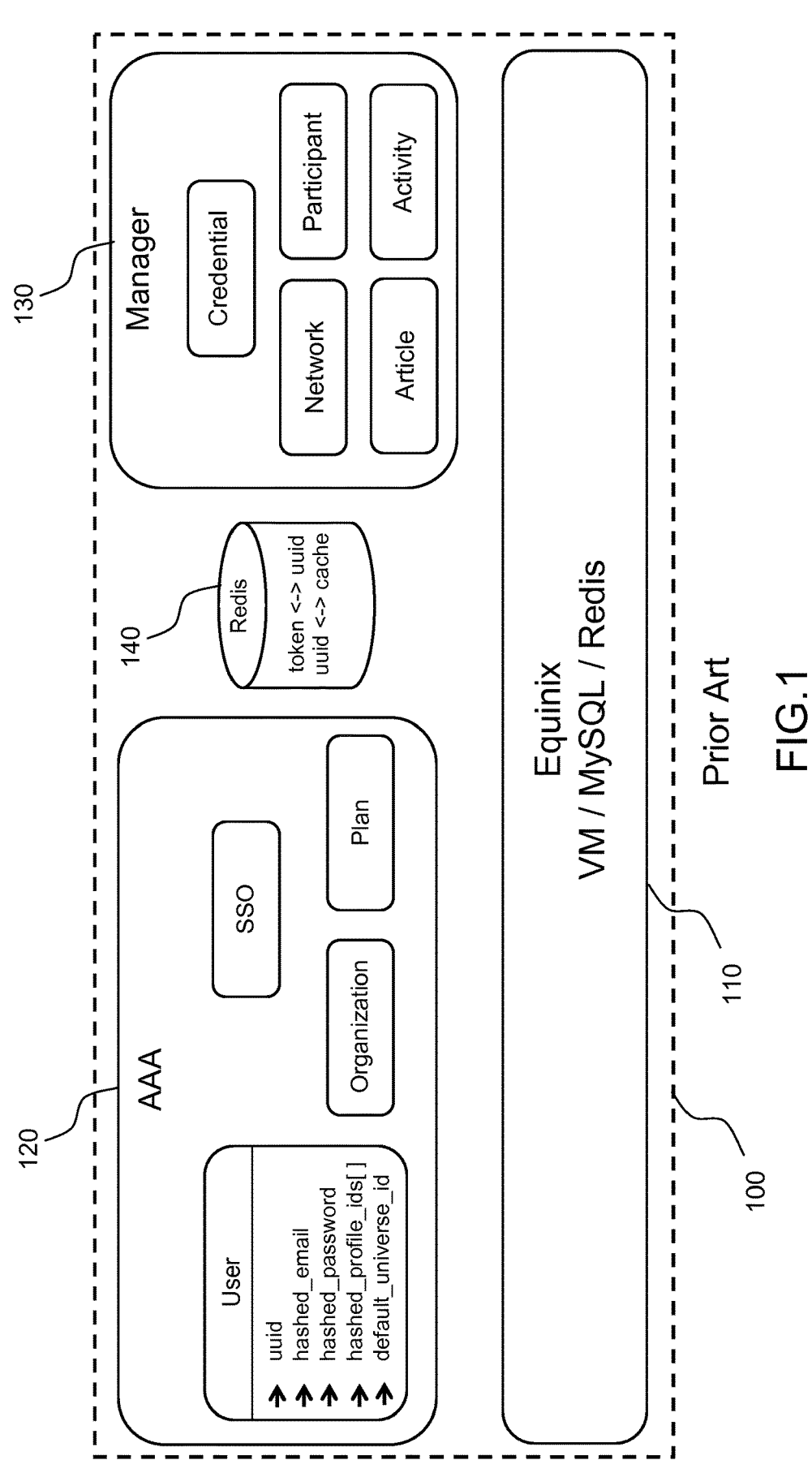
FIG. 1 depicts an example of a server configured to identify a user and deliver data upon a request to the user, in the prior art.

FIG. 1 depicts an example of a server configured to identify a user and deliver data upon a request to the user, in the prior art.

The server 100 is either a physical or a virtual machine 110, and is configured to identify a user to grant an access to resources.

To this effect, the server 100 has access to a database 140 that comprises both data relative to the identification of user, and resources to be accessed. The server runs an identification service that is configured to identify the user upon an identification request, based on relevant data, such as a login and password.

The server 100 also runs a manager that comprises user credentials including access rights to the resources. The server 100 is thus able, upon a resource request from the user, to validate if the user has the right to access the resource, and, if it is the case, send the resource back to the user.

The server 100 provides a universal access to all the resources for all the users/clients. However, all the resources from all the clients are accessed by the same server. Therefore, it is not possible to physically separate the data belonging to various clients. Moreover, if the service needs to be delivered worldwide, all the data of the database 140 will be replicated to a number of servers worldwide. This results in a waste of storage space, because data from given users that may consumed in a single country will be uselessly replicated worldwide. Meanwhile, this worldwide replication renders the control of the localization of the data impossible.

Figure 2:
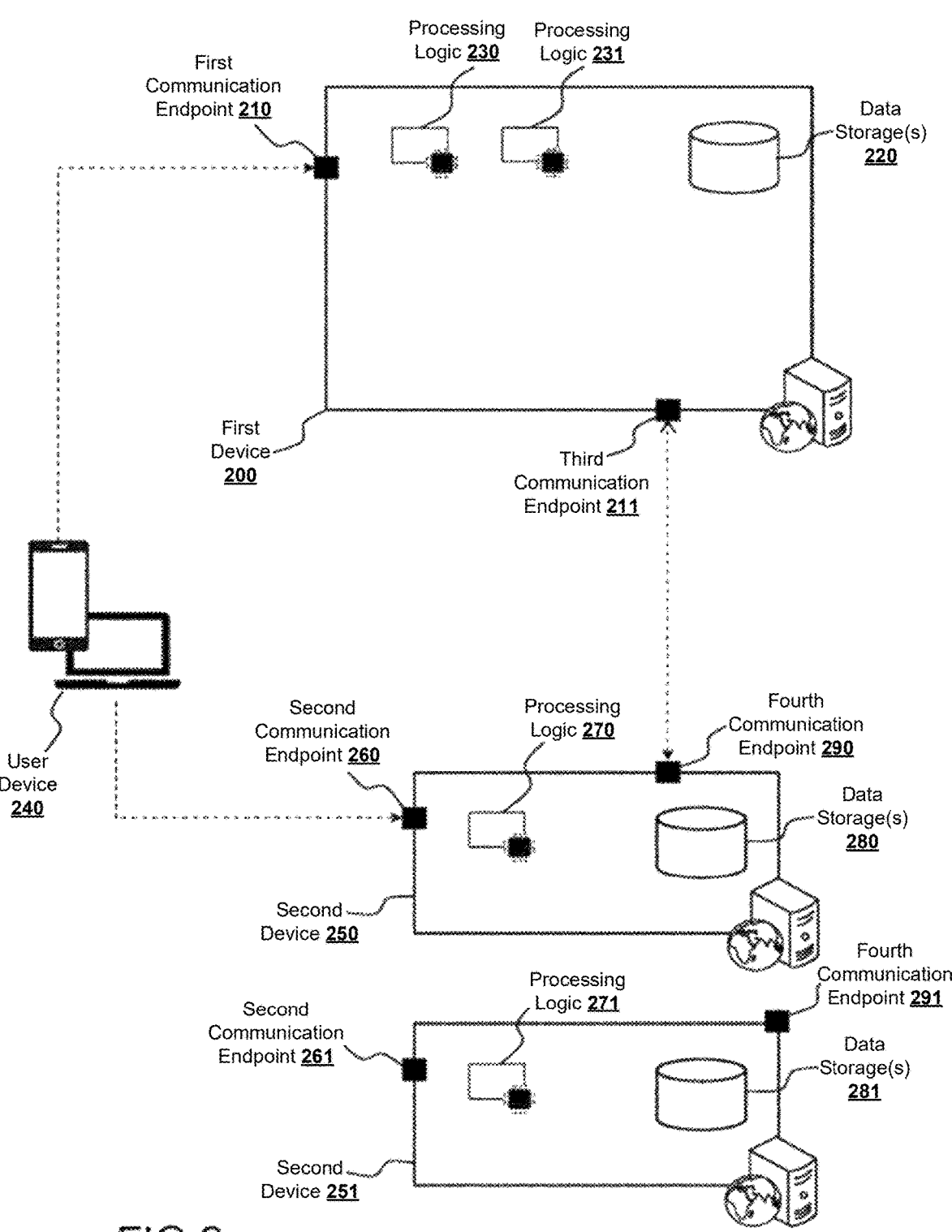
FIG. 2 depicts an example of a device in a number of embodiments of the invention.

FIG. 2 depicts an example of a device in a number of embodiments of the invention.

In a number of embodiments of the invention, a user device 240 sends requests to access resources. A user device may be any suitable kind of device having communication and processing capabilities. For example, the user device may be a smartphone, a tablet, a personal computer or a smart watch. The resources may be accessed for example using a web browser, or a computer application.

In the disclosure, the invention will be exemplified by an application, wherein the user device accesses resources allowing the execution of a dynamic presentation. For example, the resources may be pictures, videos, but also dynamic polls or scoring activities. Scoring activities are for example activities that allow obtaining scores based on inputs from the viewers of the dynamic presentation. For example, in the case of polls, the viewers can vote by selecting an item in a limited list, and the votes are collected. Any kind of activity that collects data from users in the course of a dynamic presentation can be inserted. However, the invention is not restricted to these examples, and the invention may be used for allowing a user device to access any kind of resource that may be displayed, played, executed, or more generally processed by a user device 240. For example, the resources may be office files, master files to be used for audio or video processing, etc. . . . . More generally, the invention is applicable to any data which is readable by a computer, and any data that can be stored in a binary form.

As will be explained in more details below, the user device first send a request to access a resource to a first device 200, that provides to the user device 240 the elements necessary to perform a second request to a second device 250 that actually has access to the resource.

In the disclosure, the resources are located on two or more data storages 280, 281, that are respectively accessed by two or more second devices 250, 251. For example the second device 250 has access to a second data storage 280 storing some of the resources, while the second device 251 has access to a second storage 281 storing other resources.

The first device 200, and the two or more second devices 250, 251 may be any suitable device comprising having computing and communication capabilities, and having access to storage capabilities. For example, the first device 200, and the two or more devices 250, 251 may be personal computers, or servers. Although only two devices are represented in the FIG. 2, the invention is applicable to a larger number of second devices. The number of second devices can thus be tailored according to the resources needs of the users, but also according to operational needs. For example, the second devices may be set for users, and/or dedicated to a country or region.

The two or more second data storages 280, 281 may be any type of storage suitable to store and retrieve data. For example, the two or more second data 280, 281 storages may one or more of memories, hard drives, optical discs, etc. . . . . In the FIG. 2, the two or more second data storages 280, 281 are represented in the two or more second devices 250, 251 respectively. However, although the two or more second data storages 280, 281 may be located in the one or more second devices 250, 251, the invention is not restricted to this example. For example, some or all of the two or more second data storages 280, 281 may be shared hard drives to which the two or more second devices 250, 251 respectively have access, may belong to shared databases, or may be located in devices connected to the two or more or more second devices 250, 251. For example, the disclosure is applicable to server farms, wherein the data is stored on shared hard disks/database. However, this does not restrict the ability of the invention to define precisely the localization of data, and to strictly separate data belonging to different clients. Indeed, a set of devices associated to one or more second data storages, for example a server farm, can be dedicated to a single client.

The first device 200, and the second devices 250, 251 respectively comprise a first communication endpoint 210, and second communication endpoints 260, 261 adapted to establish a connection with the user device 240. The second communication endpoints 260, 261 may be for example a WAN connection or communication ports. According to various embodiments of the invention, the second communication endpoints 260, 261 may comprise any means allowing a communication with the user device 240, such as a TCP/IP port.

The first device 200, and the second devices 250, 251 also respectively comprise processing logics 230, 231, 270, 271. In the course of the disclosure, a processing logic may be a processor operating in accordance with software instructions, a hardware configuration of a processor, or a combination thereof. It should be understood that any or all of the functions discussed herein may be implemented in a pure hardware implementation and/or by a processor operating in accordance with software instructions. It should also be understood that any or all software instructions may be stored in a non-transitory computer-readable medium. Accordingly, a plurality of processing logics of the same device may be for example different processors, a same processor configured to execute different instructions, or a plurality of computer instructions to configure one or more processors.

The repartition of the resources among the second data storages 280, 281 accessed by the second devices 250, 251 may be performed according to different rules. For example, each client or company may have its own second devices to store its resources; devices and storages may be defined for each country, etc. . . . . The disclosure thus advantageously allows a complete separation of the resources of each client, country, etc. . . . into different storages accessed by different second devices, and thus ensures a complete separation of the resources of the different clients according to the client needs. Moreover, since each client is able to precisely define the devices wherein its resources are stored, the disclosure allows a precise definition of the localization of data. For example, the disclosure allows each client to ensure that its resources are stored in its own country (i.e resources belonging to a French client in France, resources belonging to a German client in Germany, etc. . . . ).

This ability is very important for clients storing strategic or confidential data, as the concerns about data ownership and localization is growing. Moreover, the localization and protection of data is now also a legal issue, as exemplified by the European Regulation (EU) 2016/679 or General Data Protection Regulation. The disclosure, by allowing users and clients to efficiently control the localization and access rights of resources may thus help them to comply with legal requirements relative to the protection of data.

The first device has also access to one or more first data storages 220. As already explained with reference to the second data storages 280, 281, the first data storages 220 may be located within the first device 200, or within a device in connection with the first device.

The first data storages 220 store user credentials for a plurality of users. The user credentials may comprise a variety of data comprising personal data of users (name, mail address, etc. . . . ), data allowing the authentication of users, and data defining the resources the user are entitled to access. The data allowing the authentication of a user can take any suitable form, such as hash allowing verification that the secret code entered by the user is correct. The data allowing the authentication can also be an access code. The access code is a secret code generated on demand to access a single resource, or a limited set of resources. The access code is useful when a registered user wishes to perform a dynamic presentation that requires resources to be accessed by unregistered users: an access code can be generated that grants access only to a single resource, or a limited set of resources that are required by the dynamic presentation. Therefore the unregistered users can view the dynamic presentation successfully. The access code can have an expiration deadline in order to allow the unregistered user to access the resources only when the dynamic presentation is intended to be performed (for example, for one day, one week, etc. . . . ).

As noted above, the first data storages 220 also store data defining the resources a user is entitled to access. This data can take different forms. For example, it may be a list of identifiers of resources that the user has the right to access. According to various embodiment of the invention, the access rights with respect to resources may be defined in different ways. For example, a user may be granted access to a defined resource through an access code. It is also possible to define environment that encompass a large number of resources. In the dynamic presentation framework of the applicant, such an environment is named a "universe". This naming will be adhered to in the remaining of this disclosure, even though other names may be given to such kind of environments. For example, a company may define its own universe, and a user (for example an employee of the company) having access to the universe may have access to all the resources belonging to the universe.

The one or more first data storages 220 also store a set of identifiers of resources: each resource is associated with a unique identifier that allows retrieving the resource unambiguously.

Each identifier of a resource has associated therewith access rights defining the users that are entitled to access the resource. The access rights can be defined in different ways. For example, the access right may explicitly define, for each resource, a list of users having access to the resource. The access rights may also be associated indirectly to the resource: for example, a resource may be defined as belonging to the universe of a company, and access rights may be associated to this universe. For example, only the employee of a company may have access to the resource belonging to the universe of the company. More generally, access rights can be defined to groups of resources.

Each identifier of a resource is also associated to an identifier of a second communication endpoint 260, 261 of a second device 250, 251 having an access to a second data storage 280, 281 storing the resource. According to various embodiments of the invention, such identifier may be any identifier allowing a user device 240 to initiate a connection with the second device. For example, the identifier may be an URL or an IP address allowing the initiation of a connection to the second device. The identifier of the second communication endpoint of the second device therefore allows an identification, among all second devices, of the one that is able to grant access to the resource. As for the access rights, the identifiers of the second communication endpoints may be associated to the identifier of the second resource in different ways. For example, it can be associated directly by defining, for a given identifier of a resource, the identifier of the second communication endpoint 260, 261 of the second device 250, 251 having an access to a second data storage 280, 281 storing the resource. It may also be associated indirectly. For example, a second communication endpoint 260, 261 may be associated to a universe. Therefore, if a resource belongs to a universe, it is associated to the second communication endpoint 260, 261 associated with the universe. This allows defining a single communication endpoint for all resources belonging to a universe, for example of resources to be used by a company.

According to various embodiments of the invention, the resource identifiers can be stored in different ways. For example, a unique resource identifier can be stored for each resource, so that the one or more data storages 220 store an exhaustive list of all the resources. Alternatively, an identifier of a resource can be formed of a general identifier (for example an identifier of a second device, server, universe . . . ), and a unique identifier of the resource depending on the general identifier. An example of such a kind of identifier may be an url comprising the address of one of the second devices, then a unique identifier of the resource. In such an example, the second communication endpoint 260, 261, and access rights may be associated to the general identifier.

In order to retrieve a resource, the user device 240 can perform a request to the first device 200. The request comprises the identifier of the resource to access.

Upon the reception of the request, the one or more first processing logics 230 are configured to verify, based on access rights associated with the resource identifier, if the user has the right to access the resource. This can be performed in any suitable way, such as a verification whether the user belongs to user accounts having access to the resource, or the user having access to the universe the resource belongs to.

If the user has the right to access the resource, one or more first processing logics 230 are configured to send to the user the identifier of the communication endpoint of the second device having an access to the second data storage storing the resource.

For example, if the resource is located in the second storage 280, the one or more first processing logics 230 are configured to send to the user device 240 an identifier of the second communication endpoint 260 allowing the user device to connect to the second device 250. Respectively, if the resource is located in the second storage 281, the one or more first processing logics 230 are configured to send to the user device 240 an identifier of the second communication endpoint 261 allowing the user device to connect to the second device 251. This allows the user device to establish a communication with the second device that is able to deliver the desired resource.

In a number of embodiments of the invention, the user device 240 is directly redirected to the relevant second device, so that the user is not even aware that connections with different devices are used.

Therefore, the user device 240 communicates with a single entry point (in this example, the first user device 200) that provides access to the relevant second user device. This allows all the user devices to benefit from a universal and centralized access to a service.

Meanwhile, the allocation of resources across different second devices allows a strict separation between the resources belonging to different clients, as well as a strict control of the localization of data.

The storage and computation capabilities of the second devices can be tailored for each client according to its needs. This architecture therefore allows the successful development of scalable applications.

The localization of data among the second devices can also be set in order that the resources of each client are located as close as possible to the offices of the client, or more generally the places where they will be consumed. The closeness between the resources and the clients diminish the bandwidth needs, and the latency to obtain a resource. Meanwhile, it is not required to duplicate all the resources in multiple locations, if not all over the world, as in multi-tenant architectures. The architecture displayed in FIG. 2 therefore reduces the storage needs.

In a number of embodiments of the invention, the first device 200 comprises a processing logic 231 configured to authenticate a user upon an authentication request from the user device 240. Such authentication request may comprise user credential, and any suitable means to perform authentication can be used. For example, authentication methods using a login and a password may be used. According to various embodiments of the invention, the processing logic 231 may be for example the same processor as the first processing logic 230, operating with different instructions, or another processor of the first device 200.

As will be explained in more details hereinafter, in a number of embodiments of the invention, the first device 200, and the one or more second devices 250, 251 need to communicate, for example exchange authentication information relative to a user. To this effect the first device 200 may comprise a third communication endpoint 211, and the one or more second devices 250, 251 may comprise respectively one or more fourth communication endpoints 290, 291 that are configured to establish a connection with the third communication endpoint 211. Therefore, the first device 200, and the one or more second devices 250, 251 are able to communicate directly to exchange information relative to identification and/or authentication of user, as will be explained in grater details with reference to FIGS. 5c to 5e.

Figure 3:
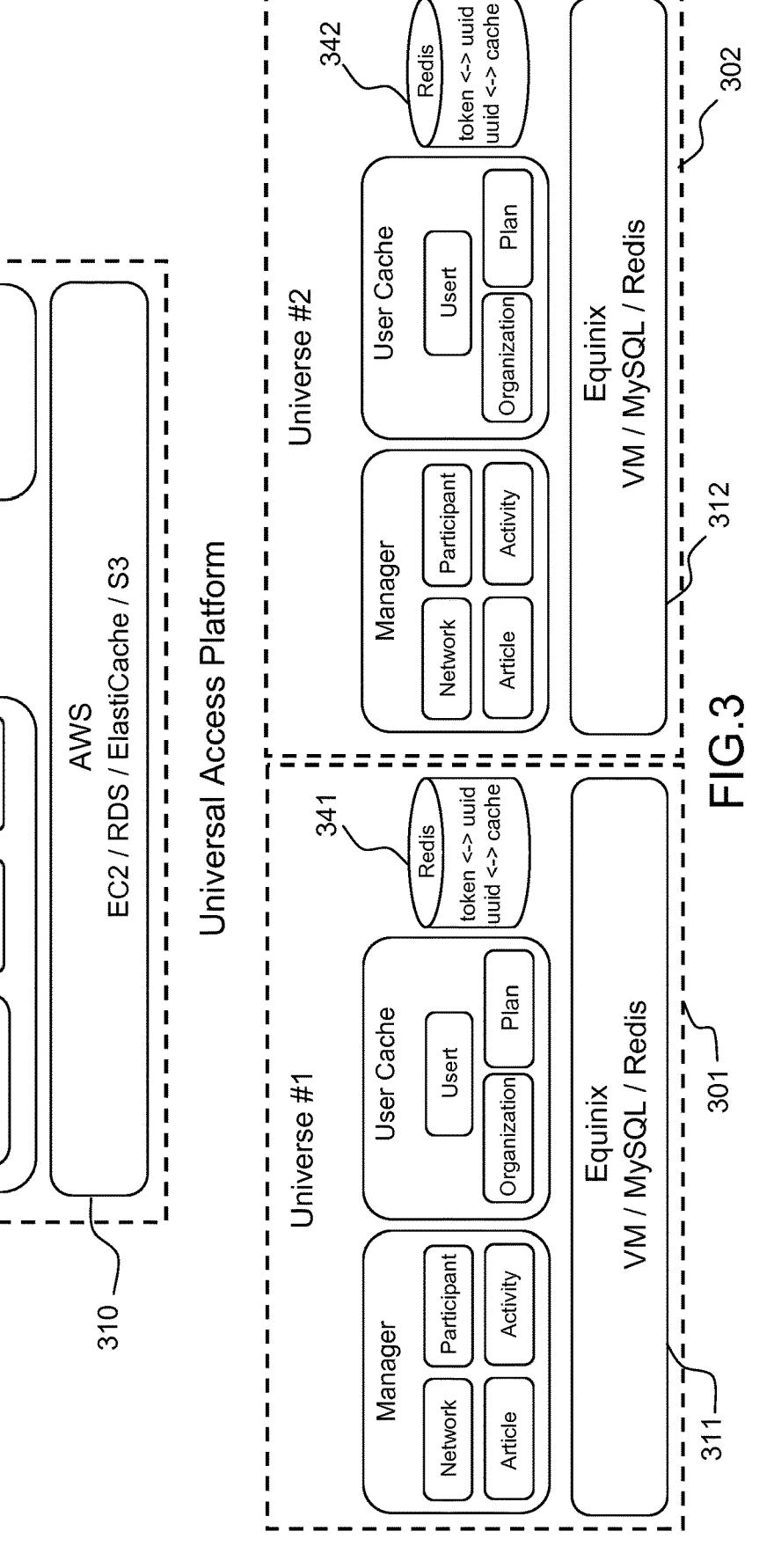
FIG. 3 depicts an example of functional architecture of servers in a number of embodiments of the invention.

FIG. 3 depicts an example of functional architecture of servers in a number of embodiments of the invention.

A first server 300 may be the first device 200 acting as a physical server, or a virtual server running on a virtual machine (VM) 310 running on the first device 200. The first server serves as a unique universal access point for users to identify themselves and request resources.

A second and third server 301 and 302 may be respectively either the second devices 250 and 251, or VMs 311, 312 running on the second devices 250 and 251 respectively. The second and third servers actually store and deliver resources to the users. A larger number of servers may be used to store and deliver the resources, but only a single server, the first server 300, serves as a universal access point for the users to identify themselves and initially request resources.

The first server 300 has access to a database 340 that stores identification data for the user, resources identifiers, resource access rights, and data relative to the servers storing the resources. The second server 301, and third server 302 have access respectively databases 341, 342 actually storing resources.

Upon a resource request from a user, the first server 300 redirects the user to the second server 301, or the third server 302, depending on the server that has access to the resource.

Therefore, contrarily to the prior art solutions as exemplified in FIG. 1, the resources owned by various users are located in different servers. Therefore, their location can be controlled, and there is no risk that the data belonging to a user is accessed by another. Meanwhile, the user benefit from a unique and universal access to the service.

Figure 4A:
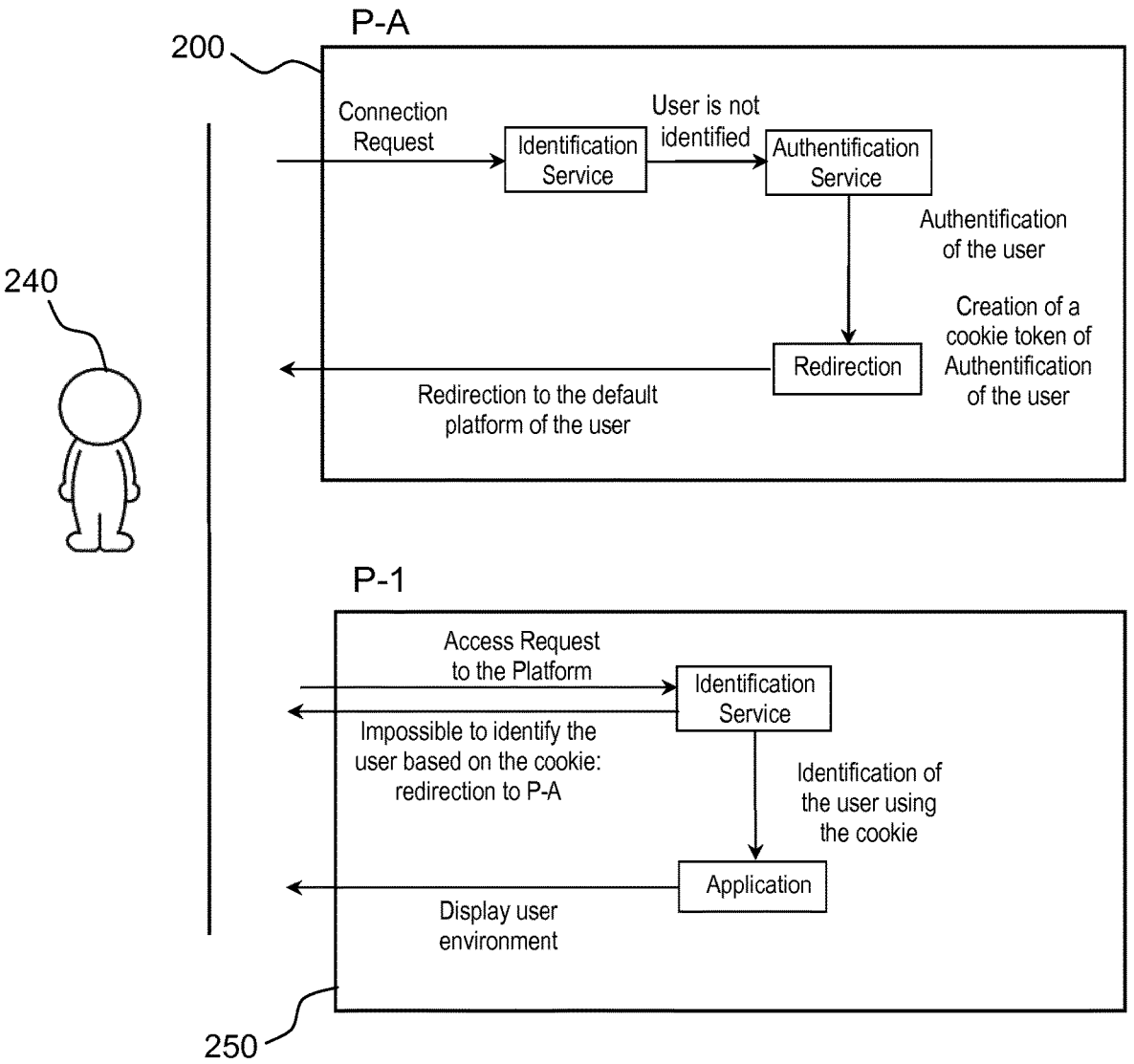
Figure 4B:
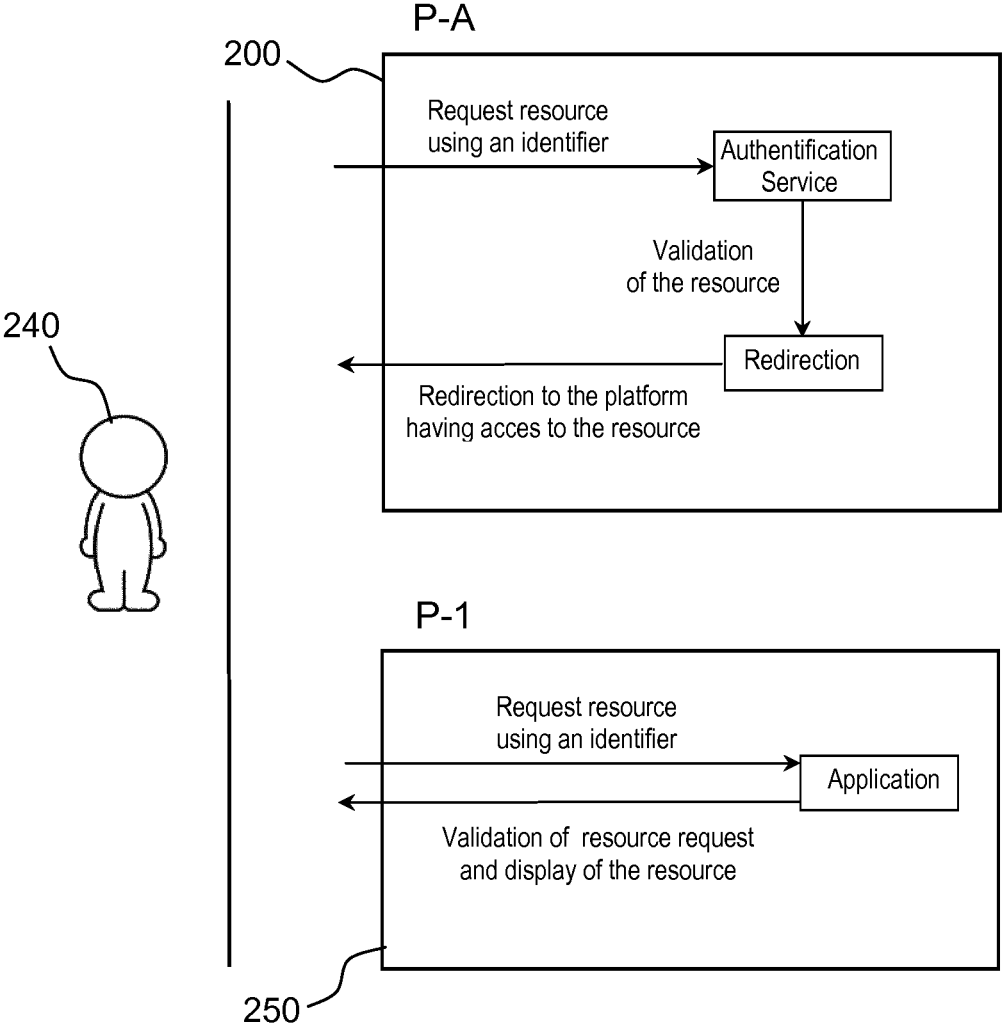

FIGS. 4a to 4c depict respectively 3 flowcharts of user interactions in a number of embodiments of the invention.

The FIG. 4a displays a flowchart of an example of an identification of a user, and access to a resource.

As noted above, a user may have access to a plurality of universes, or environments/platforms, each universe being controlled by at least one of the one or more second devices 250, 251. A universe may for example correspond to any coherent group of resources, for example a company, an application, a country, etc. . . . .

In this example, the user (more specifically the user device 240) sends a connection request to the first device 200. The user is initially not identified. The first device 200 thus authenticates the user, and creates a cookie token of authentication of the user. The user is then redirected to the second device 250, that is the default platform of the user.

The user device 240 then sends a request to access the platform of the second device 250. If it is not possible to identify the user based on the cookie, the user is redirected to the first device 200; if it is possible to identify the user, an environment of the user is displayed to the user, so that the user is able to request and display resources.

The FIG. 4b displays a flowchart of an example of an access to a resource.

The user (more specifically the user device 240) first send a resource request to the first device 200 using the identifier of the resource. In this example, the first device 200 is a server running an access service. Once the existence of the resource, and the right of the user to access the resource is validated, the user is redirected to the platform having access to the resource, in this example the second device 250.

The user device 240 thus sends a resource request using the identifier of the resource to the second device 250. The second device 250 validates the access to the resource, and sends the resource back to the user device 240, so the resource can be displayed to the user.

The FIG. 4c displays a flowchart of an example of platform switch.

In some cases a user may wish to access a platform that is different from the platform he/she is logged into. For example, the user may wish to access a platform having access to resources of another application, for example another second device 251 of the one or more second devices 250, 251. To this effect, the user device 240 sends a request to switch to another platform, for example the second device 251. The request comprises the cookie, and the second device 251 performs an identification of the user from the cookie, and displays the content of the new platform.

FIGS. 5a to 5e depict exemplary flowcharts for the creation and retrieval of a resource in a number of embodiments of the invention.

Figure 5B:
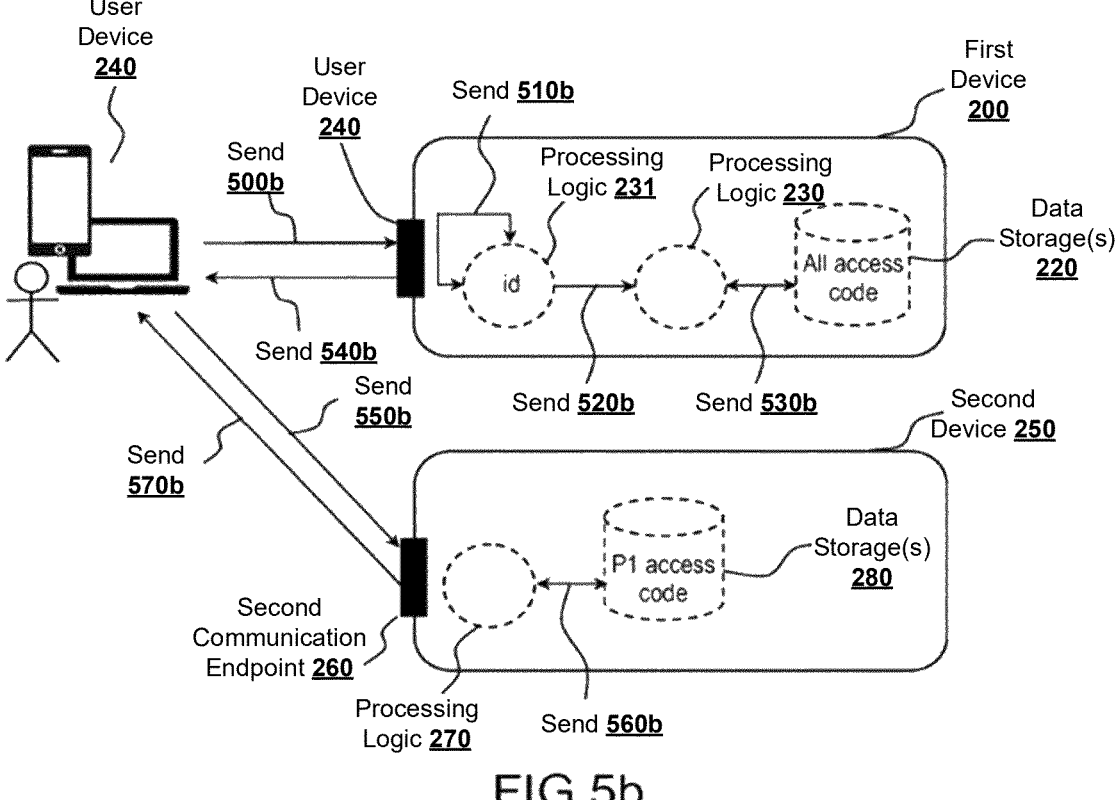
Figure 5C:
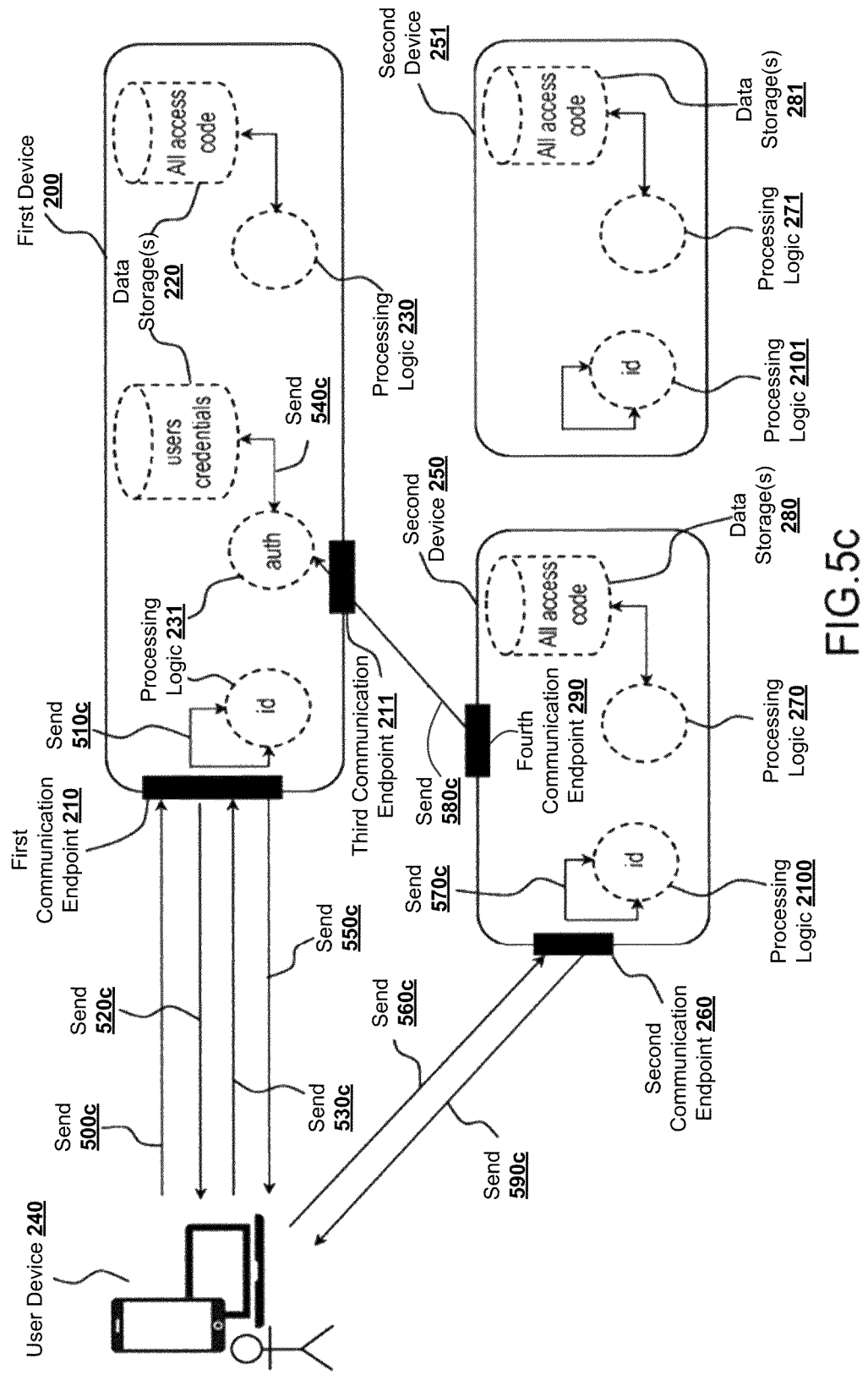
Figure 5D:
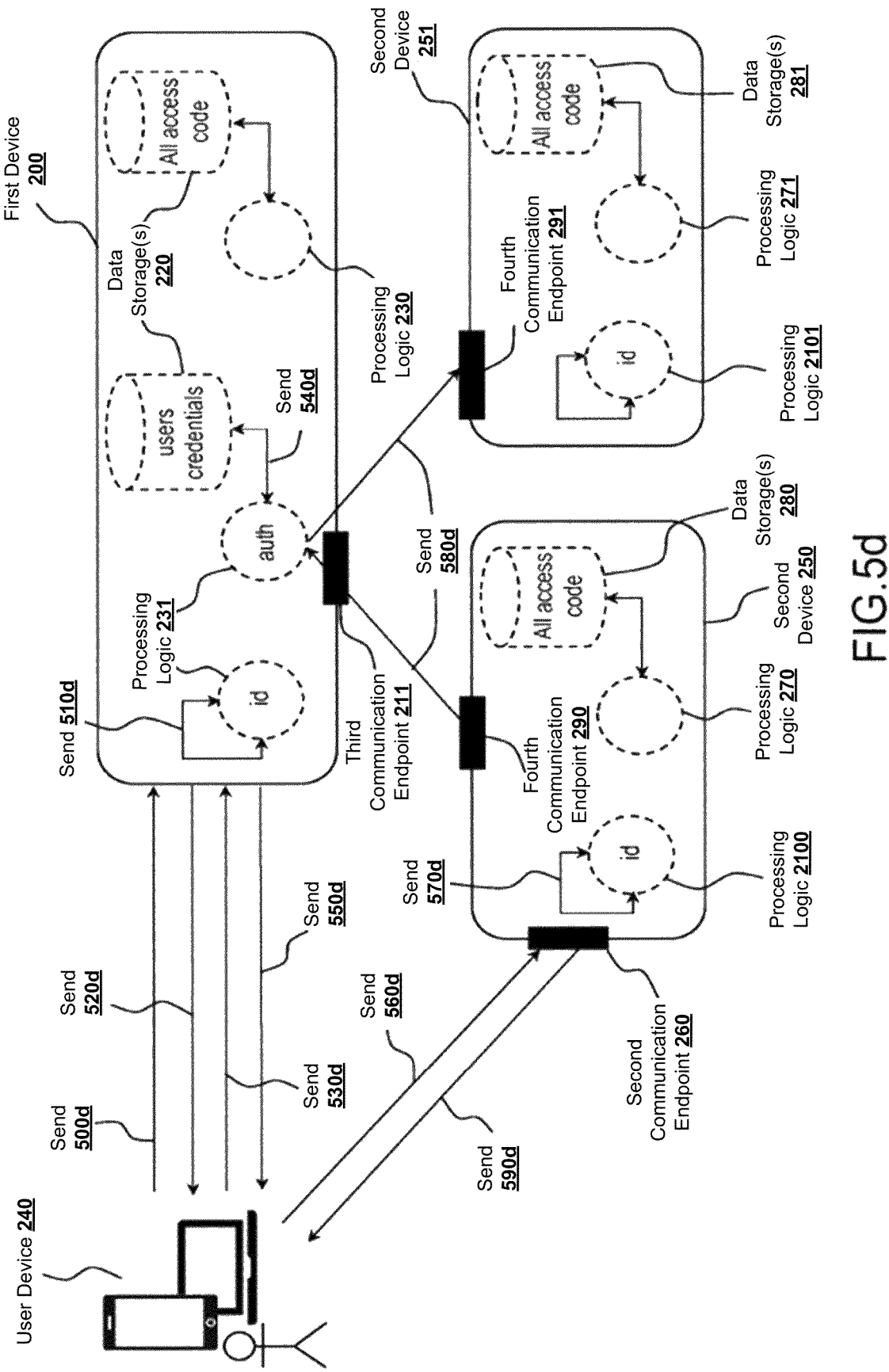
Figure 5E:
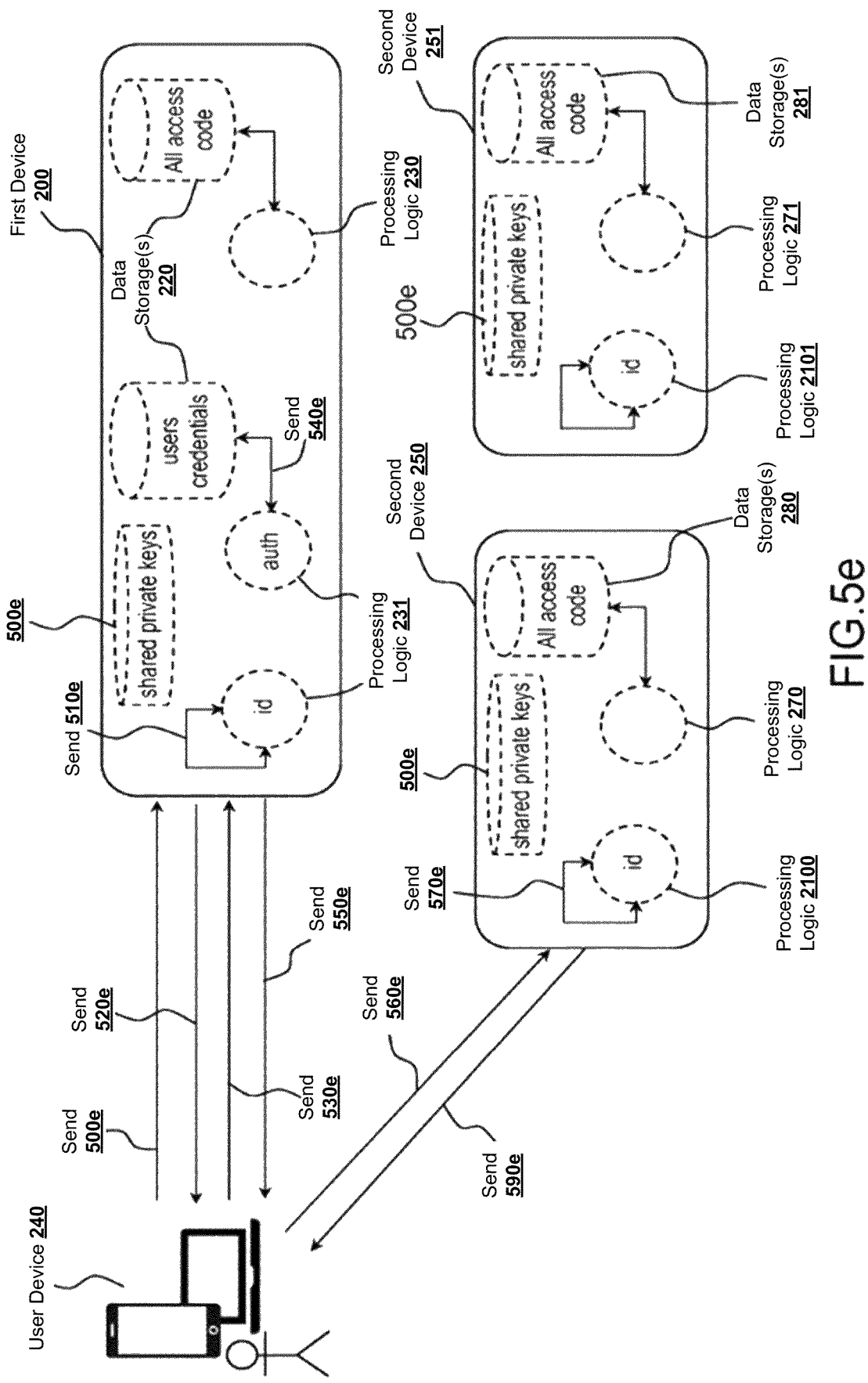

The FIGS. 5a to 5e represent the user device 240, first device 230, the second device 250, and, for the FIGS. 5c to 5e, the second device 251. However these are represented by means of example only and the examples of FIGS. 5a to 5e can be implemented with any device in which the invention may be implemented.

In the examples of FIGS. 5a to 5e, the first device 240, and second devices 250 and 251 may be for example physical and/or virtual servers that are configured to provide to the user device resources needed by an application, for example and application to perform dynamic presentations.

FIG. 5a depicts an exemplary flowchart of the creation of a resource in a number of embodiments of the invention.

As explained with reference to FIGS. 4a to 4c, the user can be connected to a second device 250 that provides to the user an environment comprising the resources needed for a context, such environment being also called a "universe". According to various embodiments of the invention, the user may have already been connected to the second device 250, because it requested a resource that the second device 250 has accessed to and/or because the second device 250 provides to the user his/her default universe. By means of example, the FIG. 5a will be exemplified with the second device 250. However this is provided by means of example only and this example may be implemented for any of the second devices of the invention.

The user of the user device 240 wishes to create a new resource. For example, the user may have created a dynamic content (ie. A poll, game, etc. . . . ) for a dynamic presentation, and wishes to store this content online for a future use, and/or allowing other users to access the content when viewing the dynamic presentations.

To this effect, the user device 240 sends a resource creation request 510a to the first device 250. The resource creation request may contain for example the content that the user wants to convert into a resource.

Upon reception of the resource creation request 510a, the second processing logic 270 is configured to generate a resource identifier generation request 520a, that is sent to the first device 200 through the fourth communication endpoint 290. The resource identifier generation request is a request to generate a resource identifier (or id) for a newly created resource.

Upon reception of the resource communication request 520a, the first processing logic 230 creates the resource identifier corresponding to the content. The resource identifier needs to be unique. Provided that this requirement is fulfilled, a number of different methods may be used to generate a unique resource identifier: a resource identifier to attribute can be incremented at each resource identifier request; the resource identifier may be created based on unique parameters such as an id of the second device 250, and the number of request that have been received from the second device 250, etc. . . . . Any suitable embodiment to generate a unique resource id is applicable to the invention. For example, the unique resource identifiers may be generated using random or pseudo-random generation methods using a limited set of characters. The set of characters may comprise alphanumeric characters (letters+digits). In a number of embodiments of the invention, the set of characters does not comprise the alphanumeric characters that may are subject to errors of interpretation when read/entered by the users (for example 0 or O; 1 or I), in order to reduce the probability that a user enters an incorrect access code.

The identifier of the resource is then stored 530*a* on the one or more data storage 220. A data representative of the second device 250 which has access to the resource and/or the second communication endpoint 260 need also to be stored in the one or more data storage 220, and associated to the resource identifier. This data may have many different types (an id of the second device 250, a descriptor or identifier of the second communication endpoint 260 . . . ). This allows a direct or indirect association between an identifier of the second communication endpoint 260 and the identifier of the resource. This identifier can be sent to user devices upon resource request, as will be explained in more details hereinafter. The storage and association of data in the one or more data storage 220 may be performed in many different was, provided that the data can be stored and retrieved. For example, the data can be stored in files having a defined format (e.g tables), or in databases. In a number of embodiments of the invention, the resource identifier is generated depending on an identifier of the second device 250, or second communication endpoint 260. For example, the resource identifier may be an url of the second communication endpoint 260, followed by a unique identifier of the resource. In such a case, the unique identifier of the resource does not need to be stored in the first data storages 220, because the first device 200 is able to redirect, based on the resource identifier, a user to the second device 250.

According to various embodiments of the invention, other data may be associated to the resource identifier, such as a descriptor of the resource, a resource type, of access rights to the resource, either directly or indirectly (for example if access rights are associated to all resources accessed by the second device 250).

The resource identifier is then sent back 540*a* to the second device 250, thereby acknowledging that the resource identifier has been successfully created.

Upon reception of the resource identifier, the second processing logic 270 is configured to store 550*a* the resource identifier, and the associated content to the one or more second data storages 280. Here again, any suitable means for storing the resource identifier and content, and associate them may be used within the invention.

The resource is therefore created, and the resource identifier is sent 560*a* to the user device 240. The user can thus use the resource freely, and share content comprising the resource easily. The resource can be simply added by specifying the unique resource identifier which, as will be explained below, will allow other users to retrieve the resource. For example, if the resource is a dynamic content in a dynamic presentation, a presentation file can be created in the user device 240 that comprises the corresponding unique resource identifier. When the user shares the dynamic presentation file to other users, the user devices of the user device can, using the unique resource identifier, retrieve the resource from the second device 250, as will be explained in more details below.

This example demonstrates the ability of the invention to create new content, and share easily the content with other users. As the content is stored in the one or more second data storage 280, only the resource identifier needs to be shared within user. This can advantageously reduce the size of files shared within user, if the resource represents large content (for example videos). Moreover, at each resource creation, the first device 200, that provides universal access, only knows that a new resource is created, but does not have any knowledge of the actual content of the resource. Meanwhile, the resource is actually created by the second device 250 that provides a secured access to a universe the user belongs to. The control of data access and data localization is therefore preserved at each resource creation.

FIG. 5*b* depicts an exemplary flowchart of the retrieval of a resource in a number of embodiments of the invention.

In this example, a user device 240 performs a request to obtain a resource, without any a priori knowledge of the location of the resource. Such a case typically arises when a user device is using a file, or content sent by another device. For example, the user device 240 can be viewing a dynamic presentation created by another user, and comprising dynamic content. The dynamic presentation is read in the form of a dynamic presentation file, wherein the resources are identified by their identifier. The user device 240 therefore needs to retrieve the resource based only on the resource identifier, without any a priori knowledge of the location of the resource.

To this effect, the user devices sends to the first device 200 a resource access request 500*b* comprising the identifier of the resource.

Upon reception of the request, if the user is not already logged in, the processing logic 231 identifies the user. The invention allows different methods for identifying a user. For example, the user may be a registered user having a login and a password. The registered user may then be entitled to have access to certain resources. The access to resources may be granted in different ways. For example, it may be granted individually for certain resources and/or the user may have access to all or a part of the resources belonging to a universe.

Another option consists in generating an "access code" that allows an unregistered user to have access to one or more specific resources. The use of an access code provides a flexible option to grant access to specific resources to unregistered users. For example, if a registered user of a company wishes to perform a dynamic presentation to unregistered user that belong to another company (for example, business clients, it may generate access codes granting to the unregistered users an access to the resources required by the dynamic presentation).

Upon reception of the resource access request 500*b*, the processing logic 231 identifies 510*b* the user, for example using a login and password, or an access code.

The request is then forwarded 520*b* to the processing logic 230, which retrieves from the one or more data storages 280, based on the identifier of the resource, the location of the resource, that is to say an information indicating the second device that has access to the resource. In this example, the resources can be retrieved by the second device 250. The processing logic 230 also verifies, based on the access rights associated with the identifier of the resource, and user credentials of the user, if the user has the right to access the resource.

If the user has the right to access the resource, an identifier of the second communication endpoint 260 of the second device is transmitted 540*b* to the user. As noted above, this identifier may be any information allowing the user device 240 to establish a connection with the second device 250: an IP address, and URL, a name of a server, etc. . . . . The user device may also be redirected to the second device 250. The redirection can be for example implemented if the resources is accessed through a web browser. The redirection allows the user to have access to information without even knowing that he/she is now in connection with a new server.

The user device then sends a new request 550*b* to access the resource, to the second device 250.

The processing logic 270 locates the resource in the one or more data storage 280 based on the resource identifier, and returns 570*b* the resource to the user.

This example demonstrates the ability of the invention to deliver resources to users using a single access point for an application, even if the user only knows the resource identifier, and does not have any a priori knowledge about the actual location of the resource.

FIG. 5*c* depicts an exemplary flowchart of the retrieval of a resource in a number of embodiments of the invention.

In this example, a user device 240 performs a request to obtain a resource, without any a priori knowledge of the location of the resource. In addition, in order to secure the identification of the user by the second device, the first device delivers to the users a token that is used for the identification by the second device.

The user sends a resource request 500*c* to the first device 200.

The processing logic 231 fails to identify the user, for example because the user is not already connected/logged in when he/she is performing the resource request.

An identification request 520*c* is thus sent to the user device. The user device 240 sends 530*c* the user credentials accordingly. The processing logic 231 authenticates the user based on the credentials, and the credentials for all users stored in the one or more first data storages 220, and generates a unique token associated to the user, for future identification, as well as a token signature to validate the identification of the user. The token is sent 550*c* to the user device 240, as well as an identifier of the second communication endpoint 260 of the second device 250 that has access to the resource.

The user device 240 then sends a new resource request 560*c* to the second device 250, comprising the identifier of the resource, and the token. The processing logic 2100 of the second device 250 tries to identify the user based on the token, but does not have the information allowing it to identify the user.

The processing logic 2100 is then configured to send a request 580*c* to validate the identification of the user based on the token to the first device 200. The first device validates the identification of the user based on the token, and sends back to the second device 250 user credentials. Alternatively, the signature can be sent to the second device 250, so that the processing logic 2100 is able to validate the identification based on the token.

The user is then successfully identified by the second device, and the second device sends 590*c* the resource back to the user.

According to various embodiments of the invention, the second device 250 may request the first device to validate the identification of the user upon each resource request by the user device. It may also request the validation of the user identification once, and store data allowing it to identify the user directly at the next resource request from the user device 240.

In this example, the user is identified using a token. However, other identification data, such as cookies, may be used. More generally, the principle described in FIG. 5*c* is applicable to any identification system that rely on identification data for each user (in this example, the token), and identification validation data that allows validating the identification (in this example, the signature of the token). The invention allows the first device 200 to send to the user device the identification data allowing it to identify itself to the second device, and, when receiving a request from the second device comprising the same identification data, confirm to the second device 250 that the user is entitled to access the resources using the identification validation data, or send the identification validation data to the second device 250, so that the processing logic 2100 is able to validate the identification.

This example demonstrates the ability of the invention to manage the identification, authentication of users and the access rights of resources in a centralized way, in the universal access point, despite the repartition of the resources in large number of different devices.

FIG. 5*d* depicts an exemplary flowchart of the retrieval of a resource in a number of embodiments of the invention.

The example of FIG. 5*d* is very similar to the example of FIG. 5*c*. The only difference is that, in order for the second device to validate the identification of the user, the first device sends 580*d* to the one or more second devices 250, 251 the identification validation data.

For example, if the user is identified using a token, the first device 200 sends to the one or more second devices 250, 251 the signature of the token, so that the one or more second devices can validate the identification; if the user is identified using a cookie, the first device 200 sends to the one or more second devices 250, 251 any data necessary to validate that the session associated with the cookie is valid (i.e session id, and, in some implementations, associated security data such as IP address of the user device 240). A man skilled in the art will easily identify the identification validation data depending on the identification technique used (for example token or cookie).

Therefore, the first device 200 sends to the one or more second devices 250, 251 all the information necessary to securely identify a user, without the one or more second devices 250, 251 having to send a request to the first device 200. Therefore, the identification of the user by the one or more second devices 250, 251 becomes quicker.

According to various embodiments of the invention, the transmission 580*d* of the identification validation data may be performed in different ways. For example, the data can be sent for a user, each time a user is identified in the first device 200, and the corresponding identification data is created. Therefore, the one or more second devices 250, 251 are virtually immediately able to identify the user.

The identification validation data may also be sent to the one or more second devices 250, 251 on a periodic basis, for a plurality of users, in order to limit the communication between the first device 200, and the one or more second devices 250, 251 and thus save bandwidth.

However, in this case, the second device 250 may not have identification validation data, when the user device 240 sends the resource request 560*c*. In order to solve this issue, the second device 250 can, in case it does not have the identification validation data, send a request to the first device to obtain this data. Therefore, this allows saving bandwidth while allowing, in all cases, the user to connect to the second device 250 to access the resource.

FIG. 5*e* depicts an exemplary flowchart of the retrieval of a resource in a number of embodiments of the invention.

The example of FIG. 5*e* is very similar to the example of FIG. 5*c*. The only difference is that, in order that the second device validates the identification of the user, the identification validation data is packaged with the identification data. The identification validation data is generated using the identification data, and shared secret keys 500*e* that are shared between the first device 200 and the one or more second devices 250, 251. The secret keys 500*e* also allow the processing logics 2100, 2101 to validate that the identification validation data is correct, and therefore successfully identify the user. This can be performed for example using signed token, that comprise a token (identification data) and a signature (identification validation data) generated using the shared private keys 500*e*. Therefore, the validity of the signature can be verified using the same shared keys 500*e*. If the validity of the signature is correct, the user is identified.

This advantageously allows a secure identification, without needing to exchange data directly between the first and one or more second devices 200, 250, 251, once the shared keys 500*e* are known by the devices.

Figure 6A:
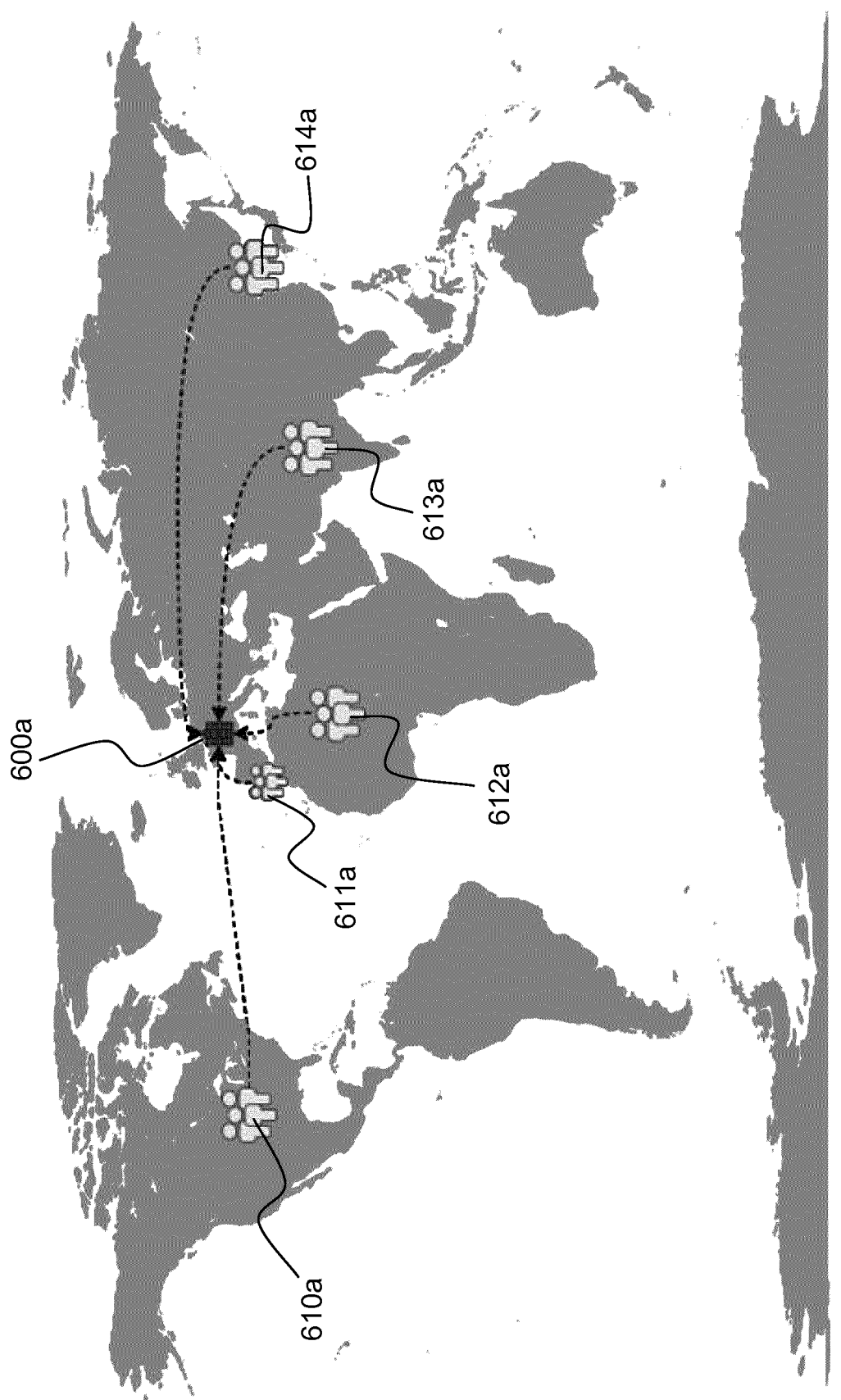
FIGS. 6a and 6b depict two examples of access to data through servers, in the prior art and in a number of embodiments of the invention respectively.
Figure 6B:
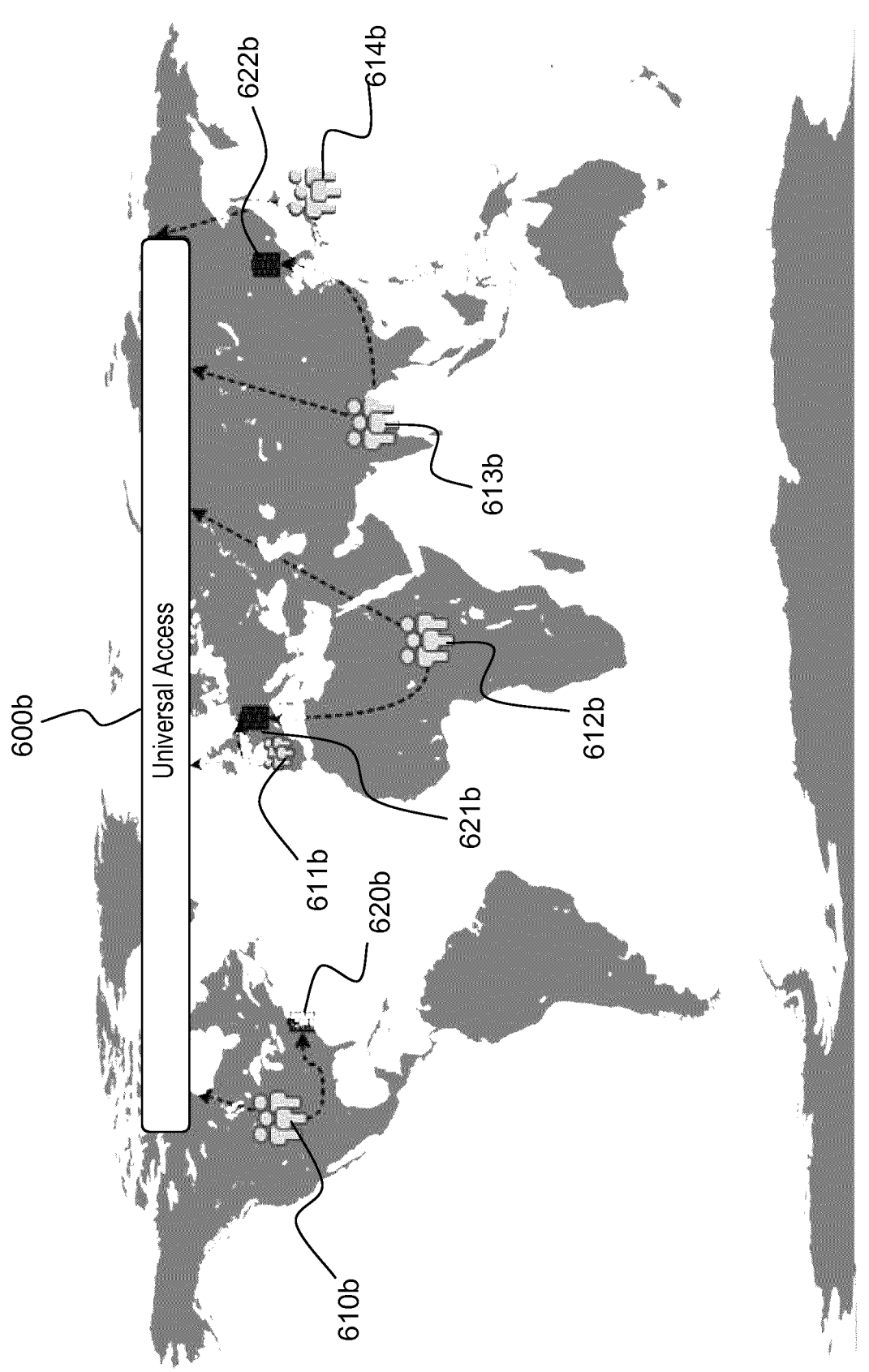

FIGS. 6*a* and 6*b* depict two examples of access to data through servers, in the prior art and in a number of embodiments of the invention respectively.

FIG. 6*a* depicts an example of access to data through servers, in the prior art.

The users 610*a*, 611*a*, 612*a*, 613*a* and 614*a*, which are located all over the world, connect to the server 600*a* to obtain the resources they need for their applications. All the resources are stored on the server 600*a*, that sends back, upon the requests from the users, the resources they need. This solution suffers from a number of drawbacks: as depicted in FIG. 6*a*, the requests and data exchanges may be performed between very distant locations. This consumes bandwidth, and generates a high latency between the time a user sends his/her request, and the time the resource is received. Moreover, all the resources are located in the same server. This may cause a security issue, because it is very difficult to ensure that resources that belong to one of the users will not be accessed by others.

FIG. 6*b* depicts an example of access to data through servers, in a number of embodiments of the invention.

The users 610*b*, 611*b*, 612*b*, 613*b* and 614*b*, which are located all over the world, connect to the server 600*b*, which serves as a universal access to the resources. However, the resources are not stored by the server 600*b*, but by servers 620*b*, 621*b*, 622*b*. The server 600*b* redirects the users to the servers storing the resource they need:

the user 610*b* is redirected to the server 620*b*;
the users 611*b* and 612*b* are redirected to the server 621*b*;
the users 613*b* and 614*b* are redirected to the server 622*b*.

Therefore, the resources can be located in a location nearer to the user: the latency of exchanges to obtain the resources is reduced. Moreover, servers can be set up according to the needs of the users. For example, it is possible to set up a server for a single client, thereby allowing a strict enhancement of the security of the data.

Figure 7:
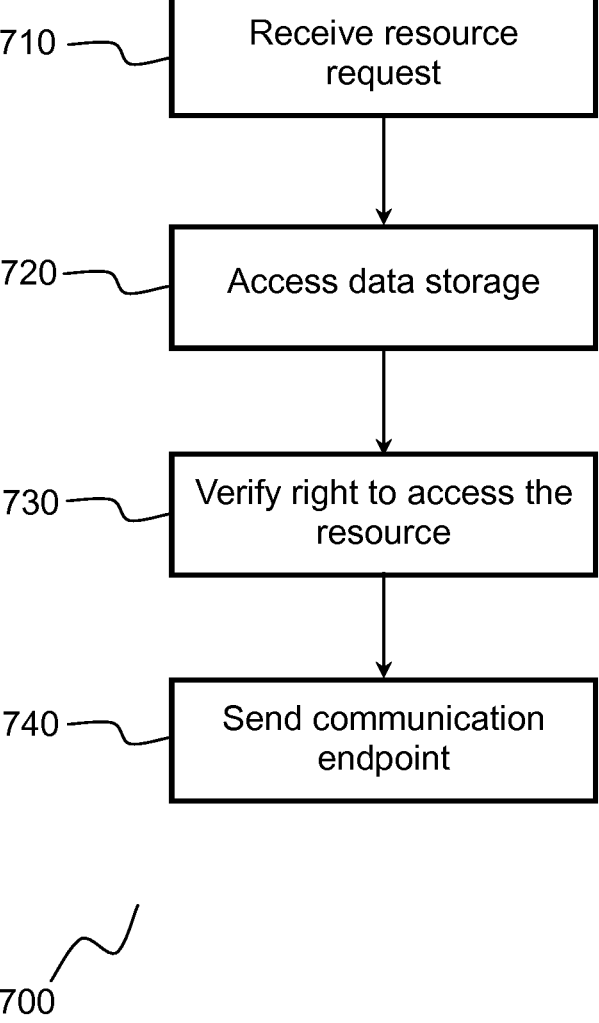
FIG. 7 depicts an example of a method in a number of embodiments of the invention.

FIG. 7 depicts an example of a method in a number of embodiments of the invention.

The method 700 comprises a first step of receiving 710 a request from a user device to access a resource, said request comprising an identifier of the resource.

The method 700 further comprises a second step 720 of accessing one or more first data storages storing:

user credentials for a plurality of users;
a set of identifiers of resources stored on two or more second data storages accessed respectively by two or more second devices, each identifier in the set having associated therewith access rights, and an identifier of a second communication endpoint of a second device having an access to a second data storage storing the resource.

The method further comprises a third step 730 of verifying, based on access rights associated with the resource identifier, if the user has the right to access the resource.

The method 700 further comprises, if the user has the right to access the resource, a fourth step 740 of sending to the user device the identifier of the communication endpoint of the second device having an access to the second data storage storing the resource.

All the embodiments discussed below are respectively applicable to the method 700.

The invention may be also implemented as a computer program configured to verify if a user has the right to access a resource, and send to a user device an identifier of a communication endpoint of a device that has access to the resources. Such a computer program may receive requests from a user device, and process the request accordingly. The embodiments described with reference to FIGS. 2, 3 4*a* to 4*c*, and 5*a* to 5*e* are respectively implementable by such computer program, in order to grant access of resources to users.

The program code embodied in such computer program is capable of being individually or collectively distributed as a program product in a variety of different forms. In particular, the program code may be distributed using a computer-readable storage medium having computer-readable program instructions thereon for causing a processor to carry out aspects of the embodiments of the invention.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art.

The invention claimed is:

1. A first device comprising:
a first communication endpoint configured to establish a connection with a user device;
an access to one or more first data storages storing:
user credentials for a plurality of users;
a set of identifiers of resources to be presented to one or more users belonging to said plurality of users stored on two or more second data storages accessed respectively by two or more second devices, each identifier in the set having associated therewith access rights, and an identifier of a second communication endpoint of a second device having an access to a second data storage storing a resource;

one or more first processing logics configured, upon receiving a request from the user device to access the said resource, said request comprising an identifier of the resource previously received by the user device, to:

verify, based on access rights associated with the received resource identifier, if a user has the right to access the requested resource;

if said user associated with said user device has the right to access the requested resource, to send to the user device the identifier of the communication endpoint of the second device having an access to the second data storage storing the resource, allowing the user device to establish a communication with the second device that is able to deliver the resource;

the first device further comprising a third communication endpoint configured to establish a connection with one or more fourth communication endpoints of the one or more second devices;

the one or more first processing logics are further configured, upon the reception of a resource identifier generation request sent to the first device through the fourth communication endpoint from one of the second devices, to:

create a unique identifier of a newly created resource; associate to said unique identifier of the resource an identifier of said one the two or more second devices, or a second communication endpoint thereof; and send to said one the two or more second devices the unique identifier of the resource, this unique identifier being sent to the user device by the two or more second devices, wherein said one or more first processing logics are configured, upon an authentication request from the user device further comprising a user credential, to authenticate the user associated with said user device based on said user credential and user credentials for the plurality of users;

wherein the one or more first processing logics are further configured to:

generate identification data allowing the one or more second devices to identify the user and grant access to the resource, and identification validation data allowing the validation of an identification of the user;

send to the user device the identification data.

2. The first device of claim 1, wherein the one or more first processing logics are configured to generate the identification validation data based on the identification data and shared secret keys that are common the first device and the one or more second devices.

3. The first device of claim 1, wherein the identification data is a token, and the identification validation data is a signature of the token.

4. The first device of claim 1, wherein the one or more first processing logics are further configured to generate identification data allowing the one or more second devices to identify the user and grant access to the resource, and identification validation data allowing the validation of an identification of the user, and are configured to send to the user device the identification data, and wherein the one or more first processing logics are configured, upon a reception, from said second device having an access to the second data storage storing the resource, a request to identify the user comprising said identification data, to:

validate an identification of the user based on said identification data and said identification validation data;

if the identification is validated, send to said second device a validation of the identification of the user and the right of the user to access the resource.

5. The first device of claim 1, wherein the one or more first processing logics are further configured to generate identification data allowing the one or more second devices to identify the user and grant access to the resource, and identification validation data allowing the validation of an identification of the user, and are configured to send to the user device the identification data, and wherein the one or more first processing logics are configured, upon a reception, from said second device having an access to the second data storage storing the resource, of a request to identify the user comprising said identification data, to send to said second device having an access to the second data storage storing the resource said identification validation data.

6. The first device of claim 1, wherein the one or more first processing logics are further configured to generate identification data allowing the one or more second devices to identify the user and grant access to the resource, and identification validation data allowing the validation of an identification of the user, and are configured to send to the user device the identification data, and wherein the one or more first processing logics are configured, upon the generation of the user validation data, to send to the one or more second devices identification validation data.

7. A method comprising:

receiving a request from a user device to access a requested resource, wherein the user device is configured to establish a connection with a first communication endpoint of a first device, said request comprising an identifier of the requested resource previously received by the user device;

accessing one or more first data storages storing:

user credentials for a plurality of users;

a set of identifiers of a set of resources to be presented to one or more users belonging to said plurality of users, comprising said requested resource, said set of resources stored on two or more second data storages accessed respectively by two or more second devices, each identifier in the set having associated therewith access rights, and an identifier of a second communication endpoint of a second device having an access to a second data storage storing the requested resource;

verifying, based on access rights associated with an identifier of the resource, if a user associated with said user device has the right to access the requested resource; if the user associated with said user device has the right to access the requested resource, sending to the user device the identifier of the communication endpoint of the second device having an access to the second data storage storing the requested resource, allowing the user device to establish a communication with the second device that is able to deliver the requested resource, the first device further comprising a third communication endpoint configured to establish a connection with one or more fourth communication endpoints of the one or more second devices;

upon the reception of a resource identifier generation request sent to the first device through the fourth communication endpoint from one of the second devices:

creating a unique identifier of a newly created resource;
associate to said unique identifier of the resource an identifier of said one the two or more second devices, or a second communication endpoint thereof; and sending to said one the two or more second devices the unique identifier of the resource, this unique identifier being sent to the user device by the two or more second devices, wherein said one or more first processing logics are configured, upon an authentication request from the user device further comprising a user credential, to authenticate the user associated with said user device based on said user credential and user credentials for the plurality of users;

wherein the one or more first processing logics are further configured to:

generate identification data allowing the one or more second devices to identify the user and grant access to the resource, and identification validation data allowing the validation of an identification of the user;

send to the user device the identification data.

8. A computer program product comprising:

a non-transitory computer-readable storage medium; and program code stored on the non-transitory computer-readable storage medium that, when executed by one or more processors, causes the one or more processors to:

receive a request from a user device to access a requested resource, wherein the user device is configured to establish a connection with a first communication endpoint of a first device, said request comprising an identifier of the resource previously received by the user device;

access one or more first data storages storing:

user credentials for a plurality of users;

a set of identifiers of a set of resources to be presented to one or more users belonging to said plurality of users, comprising said requested resource, said set of resources stored on two or more second data storages accessed respectively by two or more second devices, each identifier in the set having associated therewith access rights, and an identifier of a second communication endpoint of a second device having an access to a second data storage storing the resource;

verify, based on access rights associated with an identifier of the resource, if a user associated with said user device has the right to access the requested resource;

if the user associated with said user device has the right to access the requested resource, send to the user device the identifier of the communication endpoint of the second device having an access to the second data storage storing the requested resource, allowing the user device to establish a communication with the second device that is able to deliver the requested resource; the first device further comprising a third communication endpoint configured to establish a connection with one or more fourth communication endpoints of the one or more second devices;

upon the reception of a resource identifier generation request sent to the first device through the fourth communication endpoint from one of the second devices:

creating a unique identifier of a newly created resource;
associate to said unique identifier of the resource an identifier of said one the two or more second devices, or a second communication endpoint thereof; and sending to said one the two or more second devices the unique identifier of the resource, this unique identifier being sent to the user device by the two or more second devices, wherein said one or more first processing logics are configured, upon an authentication request from the user device further comprising a user credential, to authenticate the user associated with said user device based on said user credential and user credentials for the plurality of users;

wherein the one or more first processing logics are further configured to:

generate identification data allowing the one or more second devices to identify the user and grant access to the resource, and identification validation data allowing the validation of an identification of the user;

send to the user device the identification data.

* * * * *